(12) United States Patent
Smith et al.

(10) Patent No.: US 10,954,843 B2
(45) Date of Patent: Mar. 23, 2021

(54) CONTROL OF COMBUSTION SOURCE WITH AT LEAST ONE POLLUTION CONTROL DEVICE

(71) Applicant: Rockwell Automation Technologies, Inc., Mayfield Heights, OH (US)

(72) Inventors: Keith A. Smith, Austin, TX (US); Vincent R. Heng, Austin, TX (US); Thomas M. McDonnell, Austin, TX (US); Dennis T. Yieh, Englewood, CO (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 120 days.

(21) Appl. No.: 16/112,464

(22) Filed: Aug. 24, 2018

(65) Prior Publication Data

US 2020/0063634 A1 Feb. 27, 2020

(51) Int. Cl.
*F01N 11/00* (2006.01)
*F02D 41/14* (2006.01)
(Continued)

(52) U.S. Cl.
CPC ........ *F01N 11/007* (2013.01); *B01D 53/9431* (2013.01); *B01D 53/9495* (2013.01);
(Continued)

(58) Field of Classification Search
CPC .. F01N 3/101; F01N 2570/18; F01N 2610/03; F01N 3/106; F01N 11/005; F01N 13/008; F01N 13/009; F01N 13/0093; F01N 2250/02; F01N 2510/0684; F01N 2550/24; F01N 2560/022; F01N 2560/025; F01N 2560/06; F01N 2560/14; F01N 2570/10; F01N 2570/14; F01N 2900/0418; F01N 2900/0601; F01N 2900/1602; F01N 2900/1606; F01N 3/035; F01N 3/0807; F01N 3/10; F01N 11/007; F01N 13/004; F01N 13/08; F01N 13/1811;
(Continued)

(56) References Cited

U.S. PATENT DOCUMENTS

| | | | |
|---|---|---|---|
| 2003/0216855 A1* | 11/2003 | Liang ................. | F02D 41/1462 701/114 |
| 2015/0020530 A1* | 1/2015 | Pandey .................. | F01N 3/208 60/772 |
| 2016/0115839 A1* | 4/2016 | Abrol ................ | B01D 53/8625 60/776 |

OTHER PUBLICATIONS

Allen Bradley, Software CEM® Advanced Continuous Emissions Monitoring, Rockwell Automation, Jul. 2016.
(Continued)

*Primary Examiner* — Anthony Ayala Delgado
(74) *Attorney, Agent, or Firm* — Kunzler Bean & Adamson; Bruce R. Needham

(57) ABSTRACT

Apparatuses, systems, and methods are disclosed for emissions control. An emissions monitor module measures at least one pollutant level for an exhaust gas flow produced by a combustion source and treated by a pollution control device. The at least one pollutant level may be controllable based on at least one combustion source operating parameter and at least one pollution control device operating parameter. A control module controls the at least one combustion source operating parameter and the at least one pollution control device operating parameter based on the at least one measured pollutant level.

17 Claims, 5 Drawing Sheets

(51) Int. Cl.
  *B01D 53/94* (2006.01)
  *F02C 9/48* (2006.01)
  *F01N 3/08* (2006.01)
  *F02D 35/00* (2006.01)
  *F01N 3/20* (2006.01)

(52) U.S. Cl.
  CPC ........... *F01N 3/0814* (2013.01); *F01N 3/208* (2013.01); *F02C 9/48* (2013.01); *F02D 35/0015* (2013.01); *F02D 41/146* (2013.01); *F02D 41/1453* (2013.01); *F01N 2550/02* (2013.01); *F01N 2610/02* (2013.01); *F01N 2900/0416* (2013.01); *F01N 2900/1402* (2013.01); *F02D 2250/36* (2013.01); *F05D 2220/32* (2013.01); *F05D 2270/082* (2013.01); *F05D 2270/16* (2013.01)

(58) Field of Classification Search
  CPC ........... F01N 2240/02; F01N 2240/12; F01N 2260/04; F01N 2260/06; F01N 2340/00; F01N 2340/02; F01N 2370/04; F01N 2450/40; F01N 2470/18; F01N 2510/0682; F01N 2570/145; F01N 2590/02; F01N 2610/08; F01N 2610/1453; F01N 2900/0408; F01N 2900/12; F01N 2900/1404; F01N 3/0842; F01N 3/0871; F01N 3/20; F01N 3/2033; F01N 3/2053; F01N 3/2093; F01N 3/28; F01N 3/2892; F01N 3/30; F01N 11/002; F01N 13/0097; F01N 2330/06; F01N 2370/02; F01N 2560/027; F01N 2560/028; F01N 2590/10; F01N 2610/00; F01N 2900/0411; F01N 2900/0412; F01N 3/206; F01N 3/2828; F01N 9/005; F02D 41/0055; F02D 41/1441; F02D 41/146; F02D 41/1446; F02D 2200/0802; F02D 41/1444; F02D 41/1452
  See application file for complete search history.

(56) References Cited

OTHER PUBLICATIONS

Allen Bradley, Model Predictive Control, Rockwell Automation, Feb. 2012.

* cited by examiner

CONTROL OF COMBUSTION SOURCE WITH AT LEAST ONE POLLUTION CONTROL DEVICE

FIELD

The subject matter disclosed herein relates to combustion systems and more particularly relates to control of combustion sources with pollution control devices.

BACKGROUND INFORMATION

Combustion sources such as gas turbines, internal combustion engines, boilers, and the like are used to produce power and/or heat. A combustion source may be subject to one or more emissions limits for pollutants such as carbon monoxide (CO), combined nitric oxide (NO) and nitrogen dioxide ($NO_2$) (collectively $NO_X$), and the like. Combustion sources may provide various ways to control or limit emissions, using water injection, fuel/air mixture adjustment, flue gas recirculation, or the like. However, certain emission control methods may reduce fuel efficiency or power output, decrease emission of one pollutant while increasing emission of another pollutant, or increase wear on the combustion source. Additionally, emissions limits may be below even the reduced emission levels produced by control of the combustion source. Accordingly, a combustion system may include one or more pollution control devices in addition to a combustion source. Various types of pollution control devices may reduce emissions by removing and/or reacting certain pollutants from an exhaust gas flow.

BRIEF DESCRIPTION

An apparatus for emissions control is disclosed. A system and method also perform the functions of the apparatus. The apparatus, in one embodiment, includes an emissions monitor module that measures at least one pollutant level for an exhaust gas flow produced by a combustion source and treated by a pollution control device. In a certain embodiment, the at least one pollutant level may be controllable based on at least one combustion source operating parameter and at least one pollution control device operating parameter. In a further embodiment, the apparatus includes a control module that controls the at least one combustion source operating parameter and the at least one pollution control device operating parameter based on the at least one measured pollutant level. In certain embodiments, at least a portion of the emissions monitor module and the control module may include hardware circuits, a programmable hardware device and/or executable code stored on one or more computer readable storage media.

In one embodiment, the control module determines parameter values for the at least one combustion source operating parameter and the at least one pollution control device operating parameter based on a model of the combustion source and/or the pollution control device. In a further embodiment, the model associates sets of operating parameters for the combustion source and the pollution control device with corresponding pollutant levels. In some embodiments, a set of operating parameters may include at least one manipulated parameter and at least one disturbance parameter. In certain embodiments, the control module determines the parameter values based on a target for the at least one measured pollutant level and on at least one secondary objective. In one embodiment, the control module may iteratively obtain an updated value for the at least one measured pollutant level from the emissions monitor module, and update the parameter values based on the model.

In certain embodiments, the combustion source may include a gas turbine, an internal combustion engine, a heat-recovery steam generator (HRSG) and/or a boiler. In some embodiments, the at least one combustion source operating parameter may include a water injection rate, a fuel/air mixture, inlet air temperature, steam flow rate, water flow rate, tempering air flow rate and/or a flue gas recirculation parameter. In certain embodiments, the pollution control device may include a selective catalytic reduction (SCR) device. In some embodiments, the at least one pollution control device operating parameter may include an ammonia flow rate, a urea flow rate and/or a temperature.

In one embodiment, the at least one measured pollutant level may include a combined mono-nitrogen oxides ($NO_X$) level. In a certain embodiment, the at least one measured pollutant level may include a carbon monoxide (CO) level. In some embodiments, the apparatus may include the combustion source and/or the pollution control device.

A method for emissions control, in one embodiment, includes measuring at least one pollutant level for an exhaust gas flow produced by a combustion source and treated by a pollution control device. In a certain embodiment, the at least one pollutant level is controllable based on at least one combustion source operating parameter and at least one pollution control device operating parameter. In a further embodiment, the method includes controlling the at least one combustion source operating parameter and the at least one pollution control device operating parameter based on the at least one measured pollutant level.

In one embodiment, controlling the at least one combustion source operating parameter and the at least one pollution control device operating parameter may include determining parameter values based on a model of the combustion source and/or the pollution control device. In a certain embodiment, the model may associate sets of operating parameters for the combustion source and the pollution control device with corresponding pollutant levels. In a further embodiment, the method may include iteratively obtaining an updated value for the at least one measured pollutant level, and updating the parameter values based on the model.

An apparatus for emissions control, in another embodiment, includes an emissions monitor module that measures a combined mono-nitrogen oxides ($NO_X$) level for an exhaust gas flow produced by a gas turbine and treated by a selective catalytic reduction (SCR) device. In certain embodiments, the $NO_X$ level may be controllable based on a gas turbine water injection parameter and an SCR ammonia flow parameter. In further embodiments, the apparatus includes a control module that controls the gas turbine water injection parameter and the SCR ammonia flow parameter based on the measured $NO_X$ level. In certain embodiments, at least a portion of the emissions monitor module and the control module may include hardware and/or executable code stored on one or more computer readable storage media.

In one embodiment, the control module controls the gas turbine water injection parameter and the SCR ammonia flow parameter based on a model that associates sets of operating parameters, including the gas turbine water injection parameter and the SCR ammonia flow parameter, with corresponding $NO_X$ levels. In a certain embodiment, the control module determines the gas turbine water injection parameter and the SCR ammonia flow parameter based on a target NO$_X$ level and an objective for the gas turbine water injection parameter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
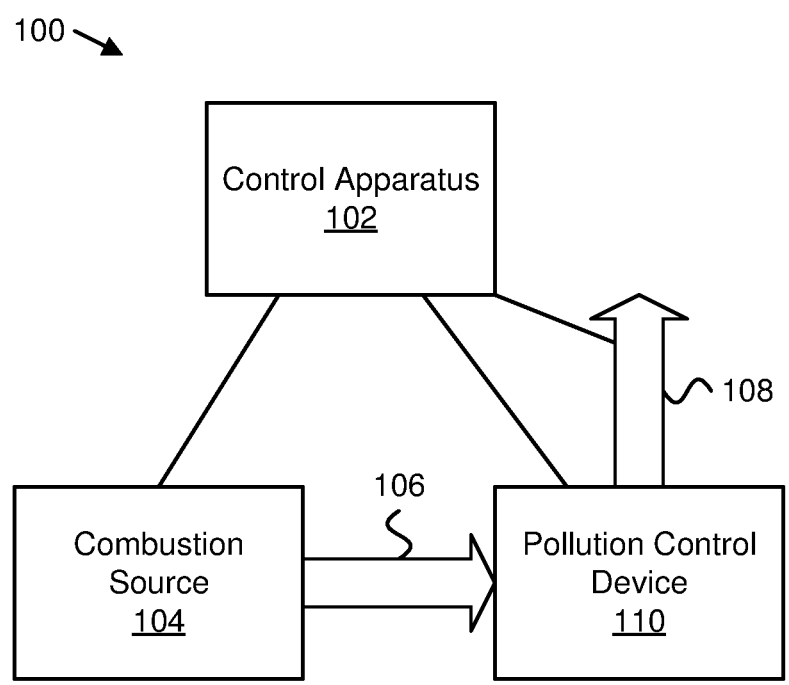
FIG. 1 is a schematic block diagram illustrating one embodiment of a combustion system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object-oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a combustion system 100. In the depicted embodiment, the combustion system 100 includes a combustion source 104, a pollution control device 110, and a control apparatus 102. A combustion source 104, in various embodiments, may be any combustion-based source of exhaust gases. A combustion device, or a set of combustion devices may be referred to as a "source," indicating that an exhaust gas flow 106, 108 originates from the combustion source 104.

In certain embodiments, a combustion source 104 may be any device, component, or set of devices or components, that combusts fuel to generate electricity, to do mechanical work, to produce steam, or the like. In further embodiments, a combustion source 104 may combust fuel for combined heat and power generation, may use waste heat from power generation to run additional electrical generators for cogeneration, in a combined cycle, or the like. In some embodiments, a combustion source 104 may include a gas turbine, an internal combustion engine (e.g., a gasoline engine, a diesel engine, a piston engine, a Wankel rotary engine, or the like), a heat-recovery steam generator (HRSG), a boiler, or the like. A gas turbine may refer to an engine that combusts fuel, using hot exhaust gases to turn a turbine. An internal combustion engine may refer to any engine that combusts fuel internally, using hot exhaust gases to do work, such as pushing a piston, turning a rotor, or the like. A boiler, in various embodiments, may combust fuel to heat water and generate steam (or to heat another working fluid). For example, a boiler may refer to a HRSG with supplementary firing (e.g., duct burners), a power plant that burns fuel to generate steam to turn a steam turbine, or the like. Steam (or another heated working fluid) from a boiler may be used for heating, for power generation, or the like. For example, an external combustion engine may include a heat engine powered by a boiler that combusts fuel.

In certain embodiments, a combustion source 104 may include one or more combustion devices, engines and/or burners. For example, in one embodiment, a combustion source 104 may include a set of multiple internal combustion engines that produce power in a combustion system 100. In another embodiment, a combustion source 104 may include a gas turbine that combusts fuel, using expanding exhaust gases to turn one or more rotating shafts, and may further include a duct burner that burns additional fuel to reheat the turbine exhaust gases for steam generation, electrical power generation, or the like. Various further types of combustion sources 104 will be clear in view of this disclosure.

In various embodiments, an exhaust gas flow 106, 108 may be produced by the combustion source 104, and treated by the pollution control device 110. An exhaust gas flow 106, 108 may include any exhaust output by a combustion source 104, whether before, during, or after treatment by the pollution control device 110, and may include exhaust gases, vapors, liquid droplets or particulate matter suspended in the gases, and the like. In the depicted embodiment, the pre-treatment or untreated exhaust gas flow 106 is output directly from the combustion source 104, and the post-treatment or treated exhaust gas flow 108 is output by the pollution control device 110, after treatment by the pollution control device 110.

In certain embodiments, a pollution control device 110 may be any device which treats the exhaust gas flow 106, 108 from the combustion source 104. In various embodiments, a pollution control device 110 may reduce levels of one or more pollutants in the exhaust gas flow 106, 108. In certain embodiments, a pollution control device 110 may treat the exhaust gas flow 106, 108 by removing pollutants, by reacting pollutants (e.g., oxidizing carbon monoxide to form carbon dioxide, reducing $NO_X$ to form $N_2$, combining sulfur dioxide with limestone to form calcium sulfate, mechanically and/or electrostatically removing particulate matter, or the like.

For example, in one embodiment, a pollution control device 110 may be, or may include, a selective catalytic reduction (SCR) device. An SCR device may add ammonia and/or urea into the exhaust gas flow 106, 108 in the presence of a catalyst, to reduce $NO_X$ and form $N_2$. In another embodiment, a pollution control device 110 may be, or may include, a selective non-catalytic reduction (SNCR) device that adds ammonia and/or urea into the exhaust gas flow 106, 108 to reduce $NO_X$ and form $N_2$ without a catalyst. In another embodiment, a pollution control device 110 may be, or may include an oxidation catalyst, that facilitates oxidation of carbon monoxide and/or unburned hydrocarbons. In another embodiment, a pollution control device 110 may include a filter, a scrubber, an electrostatic precipitator, or the like. Various further types of pollution control device 110 will be clear in view of this disclosure.

Figure 2:
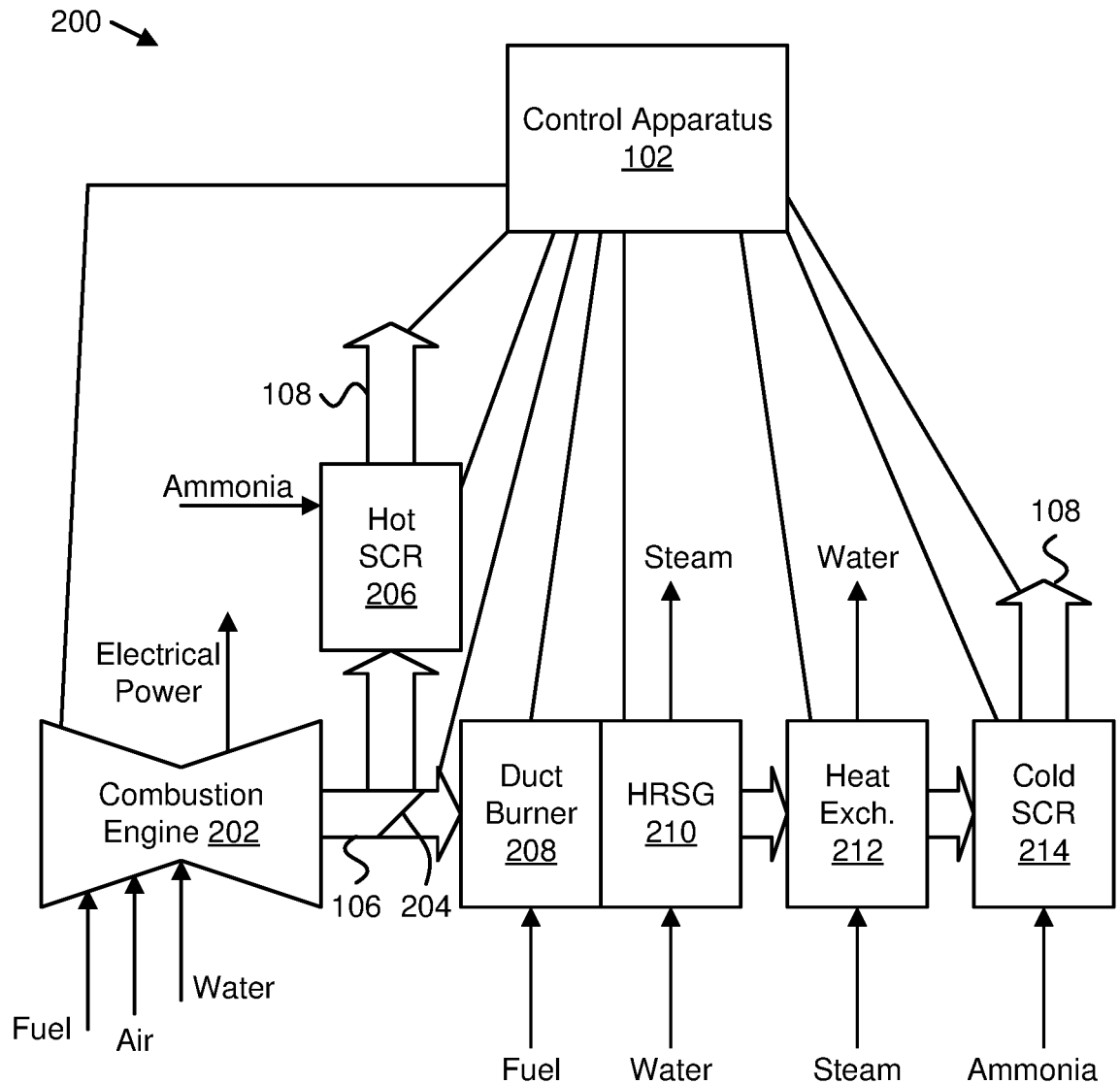
FIG. 2 is a schematic block diagram illustrating another embodiment of a combustion system.

The control apparatus 102, in certain embodiments, may measure at least one pollutant level from the exhaust gas flow 106, 108, and may control operating parameters for the combustion source 104 and the pollution control device 110 based on the measured pollutant level(s). In the depicted embodiment, the control apparatus 102 communicates with sensors for the exhaust gas flow 106, 108 to measure one or more pollutant levels, and communicates with the combustion source 104 and the pollution control device 110 to communicate and/or control operation parameters. In FIGS. 1 and 2, channels of communication for the control apparatus 102 are depicted as single lines, but may include individual electrical lines, multiple electrical lines (e.g., for controlling or measuring different parameters), wireless communication channels, networked communication channels where information is routed between the control apparatus 102 and other components. In the depicted embodiment, the control apparatus 102 receives information (e.g., one or more pollutant levels) relating to the treated exhaust gas flow 108. In another embodiment, the control apparatus 102 may receive information (e.g., one or more pollutant levels) relating to the untreated exhaust gas flow 108, or to both the untreated exhaust gas flow 106 and the treated exhaust gas flow 108.

In various embodiments, the control apparatus 102 may control one or more operating parameters of a combustion source 104 to reduce or limit levels of at least one pollutant in the un-treated exhaust gas flow 106. For example, the control apparatus 102 may limit $NO_X$ production of a combustion source 104 by limiting combustion temperatures, (e.g., by water injection, fuel/air mixture control, inlet air temperature, steam flow rate, water flow rate, tempering air flow rate, flue gas recirculation, or the like). Similarly, in further embodiments, the control apparatus 102 may control one or more operating parameters of a pollution control device 110 to reduce or limit levels of at least one pollutant in the treated exhaust gas flow 108. For example, the control apparatus 102 may reduce $NO_X$ emission in the treated exhaust gas flow 108 from an SCR device by controlling an ammonia flow rate, a urea flow rate, a catalyst temperature, or the like. Pollutant levels and operating parameters are discussed in further detail below with reference to FIGS. 2-6.

In the absence of a control apparatus 102, certain combustion sources 104 and pollution control devices 110 may be separately and independently controlled. For example, a combustion source 104 may be controlled based on an emission target for the untreated exhaust gas flow 106, and a pollution control device 110 may be controlled based on an emission target for the treated exhaust gas flow 108. However, controlling combustion sources 104 and pollution control devices 110 as separate and independent silos may result in various problems. For example, a fixed $NO_X$ target for an untreated exhaust gas flow 106 may underestimate the capacity of an SCR device to further reduce $NO_X$ emissions, and controlling the combustion source 104 to meet an overly low $NO_X$ target may reduce fuel efficiency or power output, or decrease wear.

Conversely, a fixed $NO_X$ target for an untreated exhaust gas flow 106 may overestimate the capacity of an SCR device to further reduce $NO_X$ emissions, and controlling the pollution control device 110 with overly high $NO_X$ input may result in $NO_X$ emissions in the treated exhaust gas flow 108 that exceed a limit, in ammonia slip (emission of unreacted ammonia) exceeding a limit, or the like. By contrast, using a control apparatus 102 to control operating parameters for a combustion source 104 and a pollution control device 110 may improve control of the combustion source 104 by accounting for characteristics of the pollution control device 110, and/or may improve control of the pollution control device 110 by accounting for characteristics of the combustion source 104. Various embodiments of a control apparatus 102 are discussed in further detail below with reference to FIGS. 2-6.

FIG. 2 depicts another embodiment of a combustion system 200. In the depicted embodiment, the system 200 includes a control apparatus 102, which may be substantially as described above with reference to FIG. 1. In the depicted embodiment, the system 200 further includes a combustion engine 202, a damper or bypass valve 204, a hot SCR device 206, a duct burner 208, a heat recovery steam generator 210, a heat exchanger 212, and a cold SCR device 214, as described below. Arrows in FIG. 2 depict inputs and outputs of components of the system 200. The system 200 of FIG. 2 is included for illustrative and not limiting purposes. In various embodiments, a combustion system 200 may include additional or alternate components not depicted in FIG. 2, or may omit components described in FIG. 2.

The combustion engine 202, in various embodiments, is an engine that combusts fuel to do mechanical work. In certain embodiments, the combustion engine 202 may turn a generator shaft to produce electricity. In one embodiment, the combustion engine 202 may be a gas turbine engine. In another embodiment, the combustion engine 202 may be an internal combustion engine, such as a gasoline or diesel piston engine. In the depicted embodiment, the system 200 includes a single combustion engine 202. In another embodiment, a system may include multiple combustion engines 202. For example, in one embodiment, a system may include multiple combustion engines 202, and may use one, some or all of the multiple combustion engines 202, based on power demands.

In the depicted embodiment, the combustion engine 202 burns fuel in air to produce electrical power. In a further embodiment, a combustion engine 202 may produce electrical power and/or mechanical power. Additionally, the combustion engine 202, like the combustion source 104 of FIG. 1, outputs an untreated exhaust gas flow 106. In the depicted embodiment, water may be injected into the combustion engine 202 to manage one or more pollutant levels in the untreated exhaust gas flow 106. In general, in various embodiments, CO may be formed at low combustion temperatures, due to incomplete combustion, and $NO_X$ may be formed at high combustion temperatures, due to oxidation of nitrogen in the air. Thus, in certain embodiments, reducing combustion temperatures may increase CO levels and reduce $NO_X$ levels. Conversely, increasing combustion temperatures may increase $NO_X$ levels and reduce CO levels.

In various embodiments, combustion temperatures for combustion engines 202 may be controlled in various ways. For example, in the depicted embodiment, water injection may lower combustion temperatures, reducing $NO_X$ emissions. In a certain embodiment, a fuel/air mixture for a combustion engine 202 may be controlled to increase or decrease combustion temperatures. In another embodiment, a portion of the oxygen-depleted exhaust gas for a combustion engine 202 or flue gas for a boiler may be recirculated into the input air flow, lowering combustion temperatures by diluting the comparatively oxygen-rich input air, or by diluting the fuel/air mixture. Various further ways of controlling emissions of a combustion engine 202 by controlling the combustion temperature or another parameter will be clear in view of this disclosure.

In the depicted embodiment, the system 200 includes a hot SCR device 206 and a cold SCR device 214. Both SCR devices 206, 214 inject ammonia into untreated exhaust gas to reduce $NO_X$, and output treated a treated exhaust gas flow 108. When referring to SCR devices 206, 214, the terms "hot" and "cold" are relative terms, and indicate that a hot SCR device 206 operates at a higher temperature than a cold SCR device 214. For example, in the depicted embodiment, the hot SCR device 206 receives an untreated exhaust gas flow 106 directly from the combustion engine 202, while the cold SCR device 214 receives a cooler untreated exhaust gas flow 106 after a heat recovery steam generator 210 has used waste heat in the untreated exhaust gas flow 106 to generate steam (as described below).

A damper or bypass valve 204 may control whether (or in what proportions) the untreated exhaust gas flow 106 is directed directly to the hot SCR device 206 or through further components to the cold SCR device 214. In certain embodiments, the damper or bypass valve 204 may direct the untreated exhaust gas flow 106 through the duct burner 208, the heat recovery steam generator 210, the heat exchanger 212, and the cold SCR device 214 during normal operation of the combustion engine 202, and may be adjusted to divert the untreated exhaust gas flow 106 through the hot SCR device 206 during maintenance of the duct burner 208, the heat recovery steam generator 210, the heat exchanger 212, and/or the cold SCR device 214.

In the depicted embodiment, the heat recovery steam generator (HRSG) 210 uses heat in the untreated exhaust gas flow 106 to produce steam by boiling feed water. The duct burner 208 may include a burner or set of burners disposed in the untreated exhaust gas flow 106 (e.g., in an exhaust duct), which burn fuel to heat the untreated exhaust gas flow 106 for steam production in the HRSG 210. In another embodiment, a HRSG 210 may produce steam from waste heat in the untreated exhaust gas flow 106, without using a duct burner 208 to further heat the untreated exhaust gas flow 106. In certain embodiments, burning fuel in a duct burner 208 may alter levels or pollutants and other emissions in the untreated exhaust gas flow 106. For example, the untreated exhaust gas flow 106 may include increased levels of combustion products, and decreased oxygen levels after passing through the duct burner 208.

The untreated exhaust gas flow 106 may be cooled as the HRSG 210 transfers heat out of the untreated exhaust gas flow 106 to produce steam. However, in certain embodiments, the cold SCR device 214 may be more efficient at operating temperatures higher than the temperature of the untreated exhaust gas flow 106 leaving the HRSG 210.

Accordingly, in certain embodiments, a heat exchanger 212 may use heat (e.g., in steam received from the HRSG 210) to heat the cold SCR device 214 and/or the untreated exhaust gas flow 108, to comply with an operating temperature range for the cold SCR device 214. Water returned from the heat exchanger 212 may be recirculated as boiler feed water for the HRSG 210.

In one embodiment, the system 200 may not include a heat exchanger 212 separate from the HRSG 210, and the duct burner 208 and/or the HRSG 210 may be controlled to increase or decrease the temperature of the cold SCR device 214 based on the amount of heat added to or removed from the untreated exhaust gas flow 106 (and the amount of steam produced). In another embodiment, however, a heat exchanger 212 separate from the HRSG 210 may heat or cool a cold SCR device 214 to maintain or control an operating temperature more efficiently, more accurately, and/or more responsively than by direct control of the duct burner 208 and/or the HRSG 210. In yet another embodiment, the temperature of the cold SCR device 214 may not be directly controlled.

The control apparatus 102, in various embodiments, may be communicatively coupled to the combustion engine 202, the untreated exhaust gas flow 106, the hot SCR device 206, the duct burner 208, the HRSG 210, the heat exchanger 212, the cold SCR device 214, and/or the treated exhaust gas flow 108. For example, the control apparatus 102 may be communicatively coupled to continuous emission monitoring system (CEMS) sensors that detect levels of $NO_X$, CO, $O_2$, or the like in the treated exhaust gas flow 108, and/or in the untreated exhaust gas flow 106. In a further embodiment, the control apparatus 102 may communicate with the combustion engine 202 to receive parameters such as a power level, fuel flow, inlet air temperature, or the like, and to control parameters such as a fuel/air mixture or water injection rate. Similarly, the control apparatus 102 may be communicatively coupled to the hot SCR device 206, the duct burner 208, the heat recovery steam generator 210, the heat exchanger 212, and/or a cold SCR device 214 to monitor or control various operating parameters.

As described above with reference to FIG. 1, a combustion source 104 may include a single combustion device, or multiple combustion devices. For example, in FIG. 2, the combustion engine 202 and the duct burner 208 may collectively constitute a combustion source 104. Similarly, a pollution control device 110 may include a single component, or multiple components, such as the hot SCR device 206 and the cold SCR device 214 of the system 200. As described above, the control apparatus 102 may measure at least one pollutant level, in the exhaust gas flow 106, 108, and may control operating parameters for a combustion source 104 and for a pollution control device 110 based on the measured pollutant level(s). For example, in the depicted embodiment, the control apparatus 102 may control operating parameters for the combustion engine 202 and/or the duct burner 208, as well as for the hot SCR device 206 and/or the cold SCR device 214.

Figure 3:
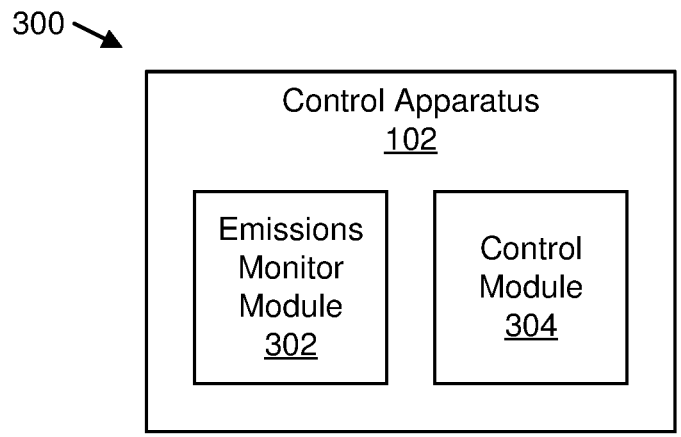
FIG. 3 is a schematic block diagram illustrating one embodiment of an apparatus for emissions control.

FIG. 3 depicts one embodiment of an apparatus 300 for emissions control. In the depicted embodiment, the apparatus 300 includes a control apparatus 102, which may be substantially as described above with regard to FIGS. 1 and 2. In the depicted embodiment, the control apparatus 102 includes an emissions monitor module 302 and a control module 304.

The emissions monitor module 302, in certain embodiments, measures at least one pollutant level for an exhaust gas flow 106, 108 produced by a combustion source 104 and treated by a pollution control device 110. As described above, the exhaust gas flow 106, 108 may include an untreated exhaust gas flow 106 from the combustion source 104, prior to treatment by a pollution control device 110, and a treated exhaust gas flow 108 after treatment by a pollution control device 110. In various embodiments, a emissions monitor module 302 may measure pollutant levels in an untreated exhaust gas flow 106, in a treated gas flow 108, upstream or downstream of various system components (e.g. a HRSG 210 as depicted in FIG. 2), between multiple combustion sources 104, between multiple pollution control devices 110, or the like Various points along an exhaust gas flow 106, 108 where an emissions monitor module 302 may measure pollutant level(s) will be clear in view of this disclosure.

In various embodiments, a pollutant may refer to a substance in, or a component of, the exhaust gas flow 106, 108. In certain embodiments, a pollutant may have harmful or undesirable effects when emitted into the environment, or may be otherwise subject to an emission limit or target. For example, pollutants from a combustion source 104 may include carbon monoxide (CO) from incomplete combustion, unburned hydrocarbons, combined mono-nitrogen oxides ($NO_X$, referring to the combination of nitric oxide (NO) and nitrogen dioxide ($NO_2$), but not to nitrous oxide ($N_2O$)), sulfur dioxide, particulate matter, or the like. Various pollutants that might be measured by a control apparatus 102 and/or removed or treated by a pollution control device 110 will be clear in view of this disclosure.

A pollutant level may refer to any measurement of the amount of a pollutant in the exhaust gas flow 106, 108, and may include a measurement relative to the exhaust gas flow 106, 108 (e.g., a percentage, a number of parts per thousand, a number of parts per million, or the like), a measurement independent of the amount of other exhaust gasses (such as a mass flow rate), or the like. Various ways of representing or a pollutant level will be clear in view of this disclosure.

In certain embodiments, the emissions monitor module 302 may include one or more sensors for measuring pollutant levels. In a further embodiment, the emissions monitor module 302 may include a continuous emission monitoring system (CEMS). In further embodiments, the emissions monitor module 302 may include communication hardware for communicating with sensors, logic and/or control hardware for controlling CEMS sensors, or processing data returned by CEMS sensors, storage hardware for recording measured pollutant levels, and/or the like.

In one embodiment, the at least one pollutant level measured by the emissions monitor module 302 may include a combined mono-nitrogen oxides ($NO_X$) level, such as a $NO_X$ level in parts per million, grams per second, or the like, in the untreated exhaust gas flow 106, the treated exhaust gas flow 108, or both. In a further embodiment, the at least one pollutant level measured by the emissions monitor module 302 may include carbon monoxide (CO) level, such as a CO level in parts per million, grams per second, or the like, in the untreated exhaust gas flow 106, the treated exhaust gas flow 108, or both. In some embodiments, the emissions monitor module 302 may measure one or more levels of various emissions in the exhaust gas flow 106, 108, which may include additional pollutant levels such as ammonia slip levels downstream of an SCR device 206, 214, non-pollutant levels such as remaining oxygen levels in the exhaust gas flow 106, 108, or the like.

The pollutant level(s) measured by the emissions monitor module 302 may, in certain embodiments, be controllable based on at least one combustion source operating parameter and at least one pollution control device operating parameter. A parameter, or operating parameter, in various embodiments, may include any value, quantity, number, or other measurable factor describing, controlling or otherwise corresponding to the operating conditions of a combustion source 104 and/or a pollution control device 110. For example, combustion source operating parameters may include a fuel flow rate, an inlet air temperature, a power setpoint, a water injection rate, a fuel/air mixture, and/or a flue gas recirculation parameter or any other values corresponding to operating conditions of the combustion source 104. Similarly, pollution control device 110 operating parameters may include a temperature, an ammonia flow rate, a urea flow rate, one or more pollutant levels (or other emission levels) in the incoming untreated exhaust gas flow 106, one or more pollutant levels (or other emission levels) in the treated exhaust gas flow 108, or the like.

Certain combustion source operating parameters and pollution device operating parameters may be set or updated by the control apparatus 102 to control a pollutant level measured by the emissions monitor module 302. Some operating parameters may affect pollutant levels, but may not be controlled or controllable by the control apparatus 102. For example, inlet air temperature may depend on the weather, and a system 100, 200 may not include any component for heating or cooling inlet air above or below an ambient temperature. Other operating parameters that affect pollutant levels may be controlled by a control apparatus 102, but may be constrained, so that they are not controllable to affect a pollutant level. For example, fuel flow rate for a combustion source 104 may be controlled to meet a power demand, and may be a function the power setpoint and the inlet air temperature. However, in certain embodiments, a pollutant level may be controllable based on an operating parameter, if the control apparatus 102 can modify the pollutant level by modifying the operating parameter. The operating parameter may be subject to constraints such as a maximum water injection rate, but may be controlled subject to those constraints to change a pollutant level.

In one embodiment, a pollutant level may be controllable based on a combustion source operating parameter such as a water injection rate, a fuel/air mixture, and a flue gas recirculation parameter. A water injection rate may include a mass or volume flow rate for water injected into a combustion source 104, a fuel to water ratio for water injection or the like. A fuel/air mixture may include a ratio of fuel to air, a ratio of air to fuel, a ratio scaled based on a stoichiometric ratio, a position or setting for a component that controls the fuel/air mixture, or the like. A flue gas recirculation parameter may include a percentage of flue gas that is recirculated, relative to total flue gas, unrecirculated flue gas, inlet air sources other than flue gas, total inlet air, or the like. Various further combustion source operating parameters that may be controlled to affect a pollutant level will be clear in view of this disclosure.

In certain embodiments, controlling combustion source operating parameters may reduce a pollutant level, but may not satisfy a target for the pollutant level. In various embodiments, a pollutant level may also be controllable based on a pollution control device operating parameter, such as an ammonia flow rate, a urea flow rate, a temperature, or the like. An ammonia flow rate may include a mass or volume injection rate, a ratio of ammonia to untreated exhaust gas, or the like. A temperature may include an exhaust gas temperature, a catalyst bed temperature, a temperature where a pollution control device 110 is in thermal contact with a heat exchanger 212, or the like. Various further pollution control device operating parameters that may be controlled to affect a pollutant level will be clear in view of this disclosure.

In certain embodiments, controlling operating parameters for the combustion source 104 or the pollution control device 110 to affect pollutant levels may cause side effects. For example, decreasing $NO_X$ levels using a combustion device operating parameter may increase CO levels or decrease fuel efficiency, due to decreased combustion temperatures. Additionally, decreasing $NO_X$ levels using certain combustion device operating parameters may increase wear on a combustion source 104, thus increasing maintenance expenses, maintenance downtime, or the like. For example, in a gas turbine engine, water injection may cause heat stress and/or pitting in turbine blades. Replacing damaged turbine components may be extremely expensive due to parts costs, downtime, and the like. Conversely, decreasing $NO_X$ levels using pollution control device operating parameters (e.g., by increasing an SCR ammonia flow parameter) may result in increased ammonia slip, or emission of unreacted ammonia. Additionally, a catalyst may lose efficiency over time, resulting in increased ammonia slip as an SCR device 206, 214 ages.

Vendors and manufacturers of combustion sources 104 and pollution control devices 110 may provide control systems that treat the combustion sources 104 and pollution control devices 110 as separate and independent silos. For example, a predetermined load curve may be used to set fuel flow rates and water injection rates for a combustion source 104 based on a power load. The water injection rate (or other controllable parameter) may be configured based on a target for a pollutant level in the untreated exhaust gas flow 106, but the actual pollutant level may vary based on other parameters such as inlet air temperature. Additionally, load curve based control may fail to account for the ability of a pollution control device 110 to further reduce a pollutant level. For example, an actual $NO_X$ level in the untreated exhaust gas flow 106 may be high for a pollution control device 110 with an aging SCR catalyst, resulting in ammonia slip that exceeds an ammonia slip limit, or may be lower than the capacity of a pollution control device 110 with a new SCR catalyst, in which case water injection may be causing unnecessary wear for the combustion source 104.

Accordingly, in certain embodiments, where at least one pollutant level measured by the emissions monitor module 302 is controllable based on at least one combustion source operating parameter and at least one pollution control device operating parameter, a control module 304 may control both the at least one combustion source operating parameter and the at least one pollution control device operating parameter based on the at least one measured pollutant level. A control module 304 that controls both the combustion source 104 and a pollution control device 110 as an integrated system rather than as separate and independent silos is advantageous in various ways and may avoid, mitigate, or reduce side effects such as ammonia slip or turbine wear.

In certain embodiments, the control module 304 may control parameter values for both the combustion source 104 and the pollution control device 110 based on one or more measured pollutant levels. For example, the control module 304 may control both a gas turbine water injection parameter, and an SCR ammonia flow parameter based on a measured $NO_X$ level.

In various embodiments, controlling a parameter value may include setting or updating a parameter value, controlling a component such as a water injector or an ammonia injector, or the like. In certain embodiments, the control module 304 may include communications hardware for sending and receiving parameter values or controlling components, logic hardware for determining parameter values, storage hardware for storing a predictive model, or the like.

In various embodiments, the control module 304 may control parameter values based on measured pollutant levels, and/or based on further measured or modeled parameters. For example, in one embodiment, a control module 304 may model or predict a $NO_X$ level for the untreated exhaust gas flow 106, and measure a $NO_X$ level for the treated exhaust gas flow 108, and may control the combustion source 104 and the pollution control device 110 based on the measured and modeled $NO_X$ levels. In a further embodiment, the control module 304 may control parameter values based on measured pollutant levels and additional measured or predicted parameters such as air temperature, power setpoint, heat exchanger temperature, and the like.

In certain embodiments, the control module 304 may model or predict certain values that are also measured or controlled. For example, temperature for a heat exchanger 212 and for a cold SCR device 214 thermally coupled to the heat exchanger 212 may be measured using a thermocouple, and may be controlled by controlling steam flow for the heat exchanger 212. However, temperature changes and corresponding emissions changes may take place over an extended time frame, so the control module 304 may use a model to predict a heat exchanger temperature after an elapsed time step, based on the current temperature and the current steam flow. A control module 304 using model-based control is described in further detail below with reference to FIG. 4.

Figure 4:
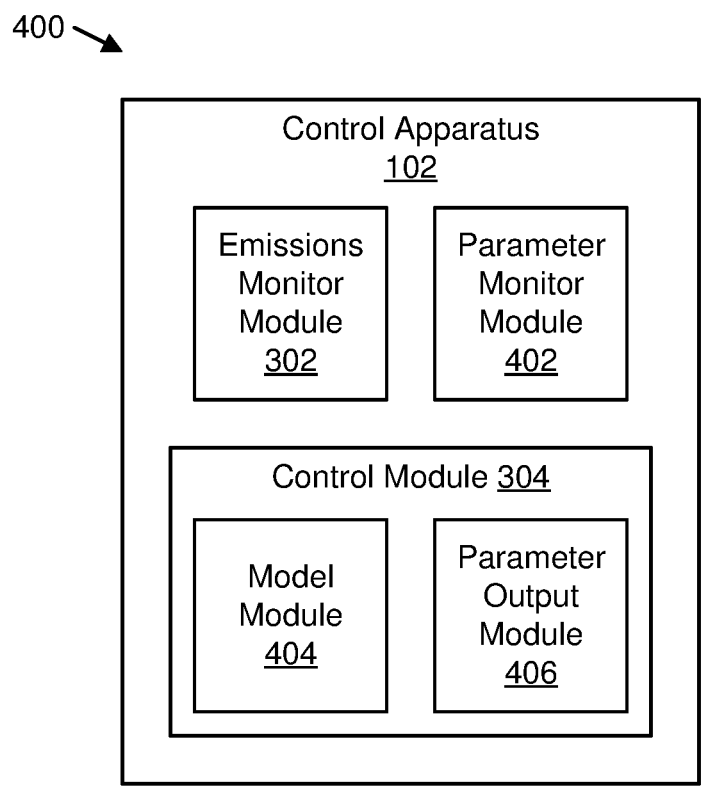
FIG. 4 is a schematic block diagram illustrating another embodiment of an apparatus for emissions control.

FIG. 4 depicts another embodiment of an apparatus 400 for emissions control. In the depicted embodiment, the apparatus 400 includes a control apparatus 102, including an emissions monitor module 302 and a control module 304 which may be substantially as described above with regard to FIGS. 1 through 3. In the depicted embodiment, the control apparatus 102 further includes a parameter monitor module 402. In the depicted embodiment, the control module 304 further includes a model module 404 and a parameter output module 406.

The parameter monitor module 402, in various embodiments, may monitor, measure, and/or record various operating parameters for the combustion source 104 and for the pollution control device 110. For example, in one embodiment, the emissions monitor module 302 may monitor pollutant levels, and the parameter monitor module 402 may monitor further parameters such as an inlet air temperature, fuel flow rate, power set point, water injection rate, fuel/air mixture, or a flue gas recirculation parameter for the combustion source 104, a temperature or ammonia flow rate for a pollution control device 110, or the like. Various sets of parameters that may be monitored will be clear in view of this disclosure. In certain embodiments, the parameter monitor module 402 may monitor uncontrolled parameters, such as inlet air temperature, and/or parameters controlled by the control module 304, such as ammonia flow rate. Monitoring a controlled parameter may provide verification that the parameter is at the value set by the control module 304.

Parameters that are measured by the parameter monitor module 402 may be used by the control module 304, in conjunction with pollutant levels measured by the emissions monitor module 302, to determine and set new/updated operating parameters for the combustion source 104 and for the pollution control device 110. In various embodiments, the parameter monitor module 402 may include sensors to determine parameter values, such as temperature sensors, communication hardware to receive parameter values from the combustion source 104 and/or the pollution control device 110, storage hardware to store parameter values, logic hardware for controlling sensors and/or processing data returned by sensors, or the like.

In the depicted embodiment, the control module 304 includes a model module 404 and a parameter output module 406. In various embodiments, the control module 304 may use the model module 404 to determine parameter values for controllable operating parameters of the combustion source 104 and/or the pollution control device 110, and may use the parameter output module 406 to output the new or updated parameters. The parameter output module 406 may receive parameters from the model module 404, and may control the combustion source 104 and/or the pollution control device 110 by outputting the new parameters.

In one embodiment, the parameter output module 406 may set or update a parameter by communicating the parameter to the combustion source 104 and/or the pollution control device 110. For example, in one embodiment, a pollution control device 110 may provide an interface for setting an ammonia flow rate, and the parameter output module 406 may set the ammonia flow rate using the provided interface. In another embodiment, the parameter output module 406 may set or update a parameter by controlling a component. For example, the parameter output module 406 may output a signal for controlling gas turbine water injectors, SCR ammonia injectors, or the like.

In one embodiment, the parameter output module 406 may control components based on feedback from the parameter monitor module 402. For example, the parameter output module 406 may output a signal to control an ammonia injector, and may adjust the signal to achieve a desired ammonia flow rate based on a measured ammonia flow rate from the parameter monitor module 402. In another embodiment, the parameter output module 406 may cooperate with the model module 404 to provide model-based feed-forward control of the combustion source 104 and/or the pollution control device 110. For example, the control module 304 may use the model module 404 to determine new/updated operating parameters for controlling the combustion source 104 and/or the pollution control device 110, and may use the parameter output module 406 to set the operating parameters to the values determined by the model module 404. In some embodiments, control of various operating components may include both feedback and feed-forward components.

In one embodiment, where a pollutant level measured by the emissions monitor module 302 is controllable based on at least one combustion source operating parameter and at least one pollution control device operating parameter, the control module 304 may use the model module 404 to determine parameter values for the at least one combustion source operating parameter and the at least one pollution control device operating parameter based on a model. The model may be a model of the combustion source 104, a model of the pollution control device 110, or a model of both the combustion source 104 and the pollution control device 110.

The model module 404, in one embodiment, may use a model to predict changes in one or more pollutant levels or other parameters. For example, the model module 404 may predict a change in a $NO_X$ emission level or another pollutant level in response to the parameter monitor module 402 detecting a change in an uncontrolled parameter such as inlet air temperature, or may predict a change in a $NO_X$ emission level or another pollutant level in response to a change in a parameter that is controlled but constrained. For example, the control apparatus 102 may increase or decrease a fuel flow rate for the combustion source 104 based on a power demand level, and the model module 404 may predict a change in a $NO_X$ emission level in response to the changed fuel flow rate. In a further embodiment, the model module 404 may predict changes in a $NO_X$ emission level or another pollutant level for various parameters that could be altered by the control module 304 to control the monitored pollutant level. For example, if a $NO_X$ emission level is above a target level, the model module 404 may predict changes in a $NO_X$ emission level based on a variety of possible changes to a turbine water injection rate and an SCR ammonia flow rate.

A model used by the model module 404 represents one or more functions, reactions, operation, etc. within the combustion source(s) 104 and/or the pollution control device(s) 110. A model used by the model module 404 may model all or a portion of the combustion source(s) 104 and/or the pollution control device(s) 110. A model used by the model module 404, in various embodiments, may associate sets of operating parameters for the combustion source 104 and the pollution control device 110 with corresponding pollutant levels. For example, in one embodiment a model may include a mathematical equation, set of equations, lookup table, or function that outputs predicted levels for one or more pollutants in response to an input set of operating parameters. In another embodiment, a model may include historical or empirical data that associates measured levels for one or more pollutants with measured operating parameters corresponding to those pollutant levels. In some embodiments, a model may include mathematical and empirical components.

A set of operating parameters (which the model module 404 may input into a model), in some embodiments may include at least one manipulated parameter and at least one disturbance parameter. A manipulated parameter may refer to a parameter that is controllable to affect a measured pollutant level. For example, manipulated parameters may include a turbine water injection rate, a fuel/air mixture, a flue gas recirculation parameter, an SCR ammonia flow rate, an SCR temperature (e.g., in systems 200 where the SCR temperature is controllable using a heat exchanger 212) or the like. A manipulated parameter may be subject to constraints, but may be variable within its constraints. For example, an ammonia flow rate for an SCR device 206, 214 may be constrained between zero (e.g., the ammonia flow rate cannot be negative) and a maximum flow rate, but may be varied and controlled within those constraints.

A disturbance parameter, in various embodiments, may refer to a parameter other than a manipulated parameter. In certain embodiments, a disturbance parameter may be an uncontrolled parameter such as an ambient air temperature, or a catalyst age, or may be controlled subject to constraints that prevent the control module 304 from varying the parameter to affect a pollutant level. For example, a fuel flow rate may be controlled based on power demand, not based on a pollutant level. In various embodiments, using a model to associate at least one manipulated parameter and at least one disturbance parameter with a corresponding pollutant level may allow the model module 404 to identify values for the manipulated parameter(s) that achieve desired pollutant level(s), subject to operating conditions defined by the disturbance parameter(s). By contrast, load-curve based control, where operating parameters for a combustion source 104 and/or for a pollution control device 110 are set based on power demand alone, may fail to account for various disturbance parameters such as ambient air temperature, catalyst age, or the like.

In certain embodiments, the control module 304 may determine the parameter values based on a target for the at least one measured pollutant level measured by the emissions monitor module 302, and based on at least one secondary objective. A target for a pollutant level may refer to any objective for controlling the pollutant level. For example, a target may be a $NO_X$ emissions limit, a CO emissions limit, or the like. In certain embodiments, a target may be selected to comply with statutory or regulatory emissions limits, such as a $NO_X$ emissions limit specified by a permit for a power plant or other combustion-based plant. In one embodiment, a target may include a mass flow rate (e.g., $NO_X$ output per minute). In another embodiment, a target may include a concentration (e.g., $NO_X$ concentration in parts per million). Various possible targets will be clear in view of this disclosure.

In various embodiments, the model module 404 may associate sets of operating parameters with a target pollutant level and may identify multiple sets of operating parameters that correspond to the target pollutant level, and that include given disturbance parameters. For example, if the $NO_X$ output level is above a target or limit with the existing fuel flow rate and air temperature, the $NO_X$ output may be decreased by increasing gas turbine water injection and/or increasing SCR ammonia injection, and the model module 404 may identify multiple sets of operating parameters that correspond to the target pollutant level, and that include the current fuel flow rate and air temperature, with various increases to the water injection rate and/or the ammonia injection rate.

A secondary objective, in various embodiments, may include any criterion or set of criteria that the control module 304 may use to select a set of manipulated parameter values for controlling the combustion source 104 and/or the pollution control device 110, when the model module 404 identifies multiple possible sets of manipulated parameter values that are predicted to satisfy a pollutant level target. For example, the control module 304 may calculate, iterate or determine a set of manipulated parameter values for optimal control of the combustion source 104 and/or the pollution control device 110.

For example, in certain embodiments, a secondary objective may include reducing or minimizing water injection (and corresponding water-based wear on the combustion source 104), reducing steam use by a heat exchanger 212 (so as not to divert output steam from the HRSG 210), limiting SCR ammonia slip, or the like. For example, in one embodiment, a model module 404 may predict that increasing water injection or increasing SCR ammonia flow may lower a $NO_X$ emission level to comply with a target, and may output an increased SCR ammonia flow, based on a secondary objective for limiting wear caused by water injection. Various other secondary objectives that may be used to set operating parameters will be clear in view of this disclosure.

The control module 304 may use find an optimal control solution to achieve certain optimality criterion. The control module 304 may include a cost function that is a function of state and manipulated parameter values. The control module 304 may include, for example within the model module 404, a set of differential equations describing the paths of the manipulated parameter values that minimize the cost function.

In one embodiment, the control module 304 may iteratively obtain an updated value for a measured pollutant level from the emissions monitor module 302, and update the parameter values based on the model used by the model module 404 to find an optimal solution. For example, in one embodiment, the model module 404 may predict a pollutant level after a time horizon or step, and the control module 304 may select corresponding values for the manipulated parameters based on a target pollutant level and a secondary objective. After the time step elapses, the emissions monitor module 302 may re-measure the pollutant level, the model module 404 may re-predict changes in the pollutant level in response to various changes in the manipulated parameters, and the parameter output module 406 may update values for the manipulated parameters accordingly. Various forms of model predictive control that iteratively update manipulated parameters based on a model will be clear in view of this disclosure. In various embodiments, iterative predictive control using a model may allow the control module 304 to make changes on supported time scales. For example, the model may reflect that a change in water injection affects the pollutant levels in a short timeframe, while a change in SCR temperature or ammonia flow rate may affect pollutant levels on a longer timeframe.

Figure 5:
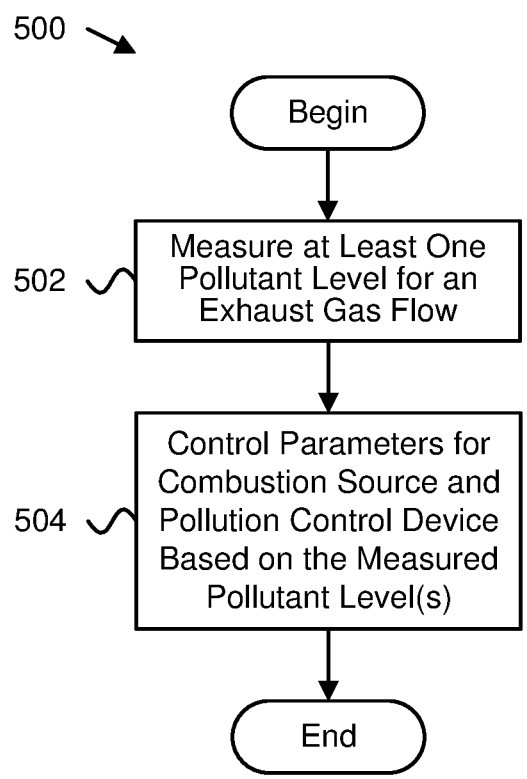
FIG. 5 is a schematic flow chart diagram illustrating one embodiment of a method for emissions control.

FIG. 5 depicts one embodiment of a method 500 for emissions control. The method 500 begins, and measures 502 at least one pollutant level for an exhaust gas flow 106, 108 produced by a combustion source 104 and treated by a pollution control device 110. In certain embodiments, the at least one pollutant level is controllable based on at least one combustion source operating parameter and at least one pollution control device operating parameter. In one embodiment, the emissions monitor module 302 may measure 502 the at least one pollutant level. The method 500 controls 504 both the at least one combustion source operating parameter and the at least one pollution control device operating parameter based on the at least one measured pollutant level, and the method 500 ends. In one embodiment, the control module 304 may control 504 the at least one combustion source operating parameter and the at least one pollution control device operating parameter.

Figure 6:
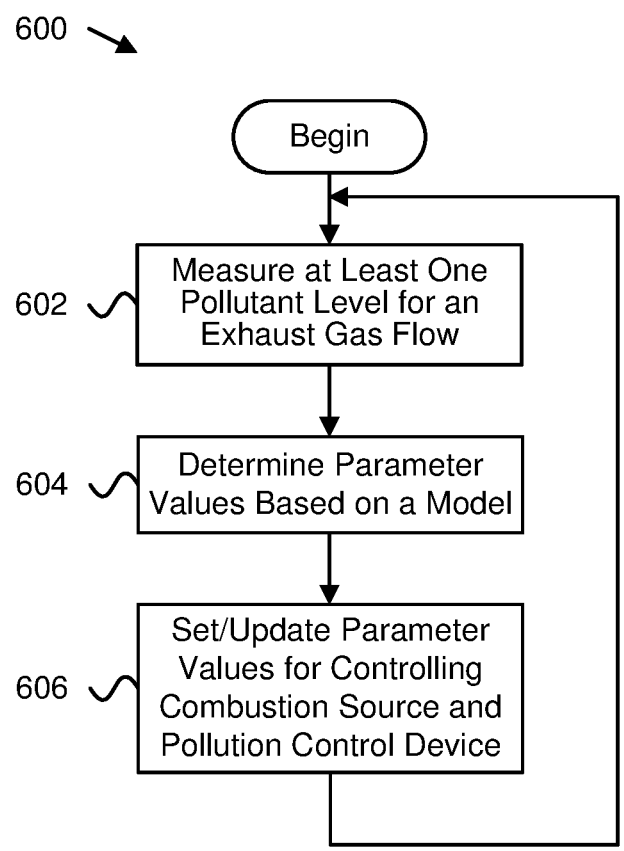
FIG. 6 is a schematic flow chart diagram illustrating another embodiment of a method for emissions control.

FIG. 6 is a schematic flow chart diagram illustrating another embodiment of a method 600 for emissions control. The method 600 begins, and measures 602 at least one pollutant level for an exhaust gas flow 106, 108 produced by a combustion source 104 and treated by a pollution control device 110. In certain embodiments, the at least one pollutant level is controllable based on at least one combustion source operating parameter and at least one pollution control device operating parameter. In one embodiment, the emissions monitor module 302 may measure 602 the at least one pollutant level. The method 600 determines 604 parameter values for the at least one combustion source operating parameter and the at least one pollution control device operating parameter, based on a model of the combustion source 104 and/or the pollution control device 110. In one embodiment, the model module 404 may determine 604 the parameter values. The method 600 sets or updates 606 the parameter values based on the model. In one embodiment, the parameter output module 406 may set or update 606 the parameter values for controlling both the combustion source 104 and the pollution control device 110. The method 600 continues, iteratively re-measuring 602 the pollutant level, re-determining 604 parameter values based on the model, and updating 606 the parameter values.

The described examples and embodiments are to be considered in all respects only as illustrative and not restrictive. This written description uses examples and embodiments to disclose the invention, including best mode, and also to enable any person skilled in the art to practice the invention, including making and using any devices or systems and performing any incorporated methods. The examples and embodiments may be practiced in other specific forms. The patentable scope of this invention is defined by the claims and may include other examples that occur to those skilled in the art. Such other examples are intended to be within the claims if they have structural elements that do not differ from the literal language of the claims, or if they include equivalent structural element with insubstantial differences from the literal language of the claims.

What is claimed is:

1. An apparatus comprising:
   an emissions monitor module that measures pollutant levels for an exhaust gas flow produced by a combustion source and treated by a pollution control device, wherein the pollutant level are controllable based on at least one combustion source operating parameter and at least one pollution control device operating parameter; and
   a control module that controls the at least one combustion source operating parameter and the at least one pollution control device operating parameter based on the measured pollutant levels,
   wherein at least a portion of the emissions monitor module and the control module comprise one or more of hardware circuits, a programmable hardware device and executable code, the executable code stored on one or more computer readable storage media,
   wherein the control module determines parameter values for the at least one combustion source operating parameter and the at least one pollution control device operating parameter based on a model of one or more of the combustion source and the pollution control device, and
   wherein the model derives optimized values for at least one combustion source operating parameter and the at least one pollution control device operating parameter while maintaining the pollutant levels of the measured exhaust gas flow of the pollution control device within prescribed limits and the control module controls the at least one combustion source operating parameter and the at least one pollution control device operating parameter with the derived optimized values for the at least one combustion source operating parameter and the at least one pollution control operating parameter.

2. The apparatus of claim 1, wherein the model associates sets of operating parameters for the combustion source and the pollution control device with corresponding pollutant levels of the measured exhaust gas flow.

3. The apparatus of claim 2, wherein a set of operating parameters comprises at least one manipulated parameter and at least one disturbance parameter.

4. The apparatus of claim 1, wherein the control module determines the parameter values based on a target for the measured pollutant levels and on at least one secondary objective.

5. The apparatus of claim 1, wherein the control module iteratively:
   obtains an updated pollutant level value for the measured exhaust gas flow from the emissions monitor module; and
   updates the parameter values to derive the optimized values of the model.

6. The apparatus of claim 1, wherein the combustion source comprises one or more of: a gas turbine, an internal combustion engine, a heat-recovery steam generator (HRSG) and a boiler.

7. The apparatus of claim 1, wherein the at least one combustion source operating parameter comprises one or more of: a water injection rate, a fuel/air mixture, inlet air temperature, steam flow rate, water flow rate, tempering air flow rate and a flue gas recirculation parameter.

8. The apparatus of claim 1, wherein the pollution control device comprises a selective catalytic reduction (SCR) device.

9. The apparatus of claim 1, wherein the at least one pollution control device operating parameter comprises one or more of: an ammonia flow rate, a urea flow rate and a temperature.

10. The apparatus of claim 1, wherein the measured pollutant levels comprise combined mono-nitrogen oxides ($NO_X$) levels.

11. The apparatus of claim 10, wherein the measured pollutant levels further comprise carbon monoxide (CO) levels.

12. The apparatus of claim 1, further comprising one or more of the combustion source and the pollution control device.

13. A method comprising:
   measuring pollutant levels for an exhaust gas flow produced by a combustion source and treated by a pollution control device, wherein the measured pollutant levels are controllable based on at least one combustion source operating parameter and at least one pollution control device operating parameter; and
   controlling the at least one combustion source operating parameter and the at least one pollution control device operating parameter based on the measured pollutant levels,
   wherein controlling the at least one combustion source operating parameter and the at least one pollution control device operating parameter comprises determining parameter values based on a model of one or more of the combustion source and the pollution control device, and
   wherein the model derives optimized values for at least one combustion source operating parameter and the at least one pollution control device operating parameter while maintaining the pollutant levels of the measured exhaust gas flow of the pollution control device within prescribed limits and controlling the at least one combustion source operating parameter and the at least one pollution control device operating parameter based on the measured pollutant levels comprises controlling the at least one combustion source operating parameter and the at least one pollution control device operating parameter with the derived optimized values for the at least one combustion source operating parameter and the at least one pollution control operating parameter.

14. The method of claim 13, wherein the model associates sets of operating parameters for the combustion source and the pollution control device with corresponding pollutant levels of the measured exhaust gas flow.

15. The method of claim 13, further comprising iteratively:
   obtaining an updated pollutant level value for the measured exhaust gas flow; and
   updating the parameter values to derive the optimized values of the model.

16. An apparatus comprising:
   an emissions monitor module that measures a combined mono-nitrogen oxides ($NO_X$) level for an exhaust gas flow produced by a gas turbine and treated by a selective catalytic reduction (SCR) device, wherein the $NO_X$ level is controllable based on a gas turbine water injection parameter and an SCR ammonia flow parameter; and
   a control module that controls the gas turbine water injection parameter and the SCR ammonia flow parameter based on the measured $NO_X$ level,
   wherein at least a portion of the emissions monitor module and the control module comprise one or more of hardware and executable code, the executable code stored on one or more computer readable storage media,
   wherein the control module controls the gas turbine water injection parameter and the SCR ammonia flow parameter based on a model that associates sets of operating parameters, including the gas turbine water injection parameter and the SCR ammonia flow parameter, with corresponding NOX levels, and
   wherein the model derives optimized values for the gas turbine water injection parameter and the SCR ammonia flow parameter while maintaining NOX levels within prescribed limits and the control module outputs the gas turbine water injection parameter and the SCR ammonia flow parameter corresponding to the derived optimized values for the optimal gas turbine water injection parameter and the SCR ammonia flow parameter from.

17. The apparatus of claim 16, wherein the control module determines the gas turbine water injection parameter and the SCR ammonia flow parameter based on a target $NO_X$ level and an objective for the gas turbine water injection parameter.

* * * * *